(12) United States Patent
Svarczkopf

(10) Patent No.: US 11,175,209 B1
(45) Date of Patent: Nov. 16, 2021

(54) FRICTION FLOW LOOP TEST METHOD AND APPARATUS

(71) Applicant: Imperative Chemical Partners, Inc., Midland, TX (US)

(72) Inventor: Timothy C Svarczkopf, Midland, TX (US)

(73) Assignee: Imperative Chemical Partners, Inc., Midland, TX (US)

( * ) Notice: Subject to any disclaimer, the term of this patent is extended or adjusted under 35 U.S.C. 154(b) by 0 days.

(21) Appl. No.: 17/191,939

(22) Filed: Mar. 4, 2021

Related U.S. Application Data

(60) Provisional application No. 63/016,720, filed on Apr. 28, 2020.

(51) Int. Cl.
*G01N 11/04* (2006.01)
*E21B 43/26* (2006.01)

(52) U.S. Cl.
CPC .............. *G01N 11/04* (2013.01); *E21B 43/26* (2013.01)

(58) Field of Classification Search
None
See application file for complete search history.

(56) References Cited

U.S. PATENT DOCUMENTS

2009/0090504 A1* 4/2009 Weightman ............ G01N 11/04
166/250.01
2015/0238914 A1* 8/2015 Luharuka .............. B01F 3/1221
366/154.1
2016/0333258 A1* 11/2016 Drake ..................... E21B 37/00

* cited by examiner

*Primary Examiner* — Melissa J Koval
*Assistant Examiner* — Joseph O Nyamogo
(74) *Attorney, Agent, or Firm* — Phillips Murrah PC; Martin G. Ozinga

(57) ABSTRACT

The present invention comprises a friction flow loop test method and apparatus that simulates well bore hydraulic conditions during fracturing utilizing large dual tanks with a primary feed tank and a secondary receiving tank wherein friction reducer hydration is controlled in an environment matching the well bore and is unaffected by recirculation mixing.

1 Claim, 5 Drawing Sheets

FRICTION FLOW LOOP TEST METHOD AND APPARATUS

CROSS-REFERENCE TO RELATED APPLICATIONS

Priority is claimed from U.S. Provisional Patent Application Ser. No. 63/016,720 filed on Apr. 28, 2020, and incorporated by referenced herein.

BACKGROUND OF THE INVENTION

1. Field of the Invention

In general, the present invention relates to oil and gas well fracturing. More particularly, the present invention provides an apparatus, system, and method to simulate well bore hydraulic conditions for determining associated affects friction reducers have on fluids over a wide range of pressures and flow rate conditions for optimal results during fracturing.

2. Description of the Prior Art

The fracturing fluids used for gas shale stimulations consist primarily of water but also include a variety of additives. The number of chemical additives used in a typical fracture treatment varies depending on the conditions of the specific well being fractured. The predominant fluids currently being used for fracture treatments in the oil and gas shale plays are water-based fracturing fluids mixed with friction-reducing additives called slickwater. The addition of friction reducers allows fracturing fluids and proppant to be pumped to the target zone at a higher rate and reduced pressure than if water alone were used.

Because the make-up of each fracturing fluid varies to meet the specific needs of each area, there is no one-size-fits-all formula for the volumes for each additive. In classifying fracturing fluids and their additives it is important to realize that service companies that provide these additives have developed a number of compounds with similar functional properties to be used for the same purpose in different well environments. The difference between additive formulations may be as small as a change in concentration of a specific compound.

There are friction flow loops commercially available in the prior art for laboratory measurement of friction reducer efficacy. Two such prior art devices, Chandler Model 6500 and Grace Model M9250, have the following flaws that cause the instruments and methods to fail to provide reliable results that correlate to field performance.

Both units utilize a single tank operation that results in fluid recycled back to the feed tank within seconds of unit start up. This causes complete hydration of the friction reducer polymers being tested and overstates friction reducer capabilities. The actual well bore engineering is such that a fracturing fluid not treated with friction reducer traveling at 75 FPS through 4.778" ID pipe generates a pipe friction of 1.2 PSI/foot as the fluid first leaves the blender tub. Therefore, the failure of a friction reducer to hydrate fully and perform effectively can cause 1350 PSI of increased treating pressure within the first 15 seconds of leaving the blender tub. Hydration speed of the fluid must be accurately measured or the data generated will not reliably predict field performance. Neither the apparatus nor method is set up to do this in the prior art.

Both units are equipped with a low shear top mounted mixer that is used to hydrate friction reducer polymer before the experiment even begins. This also contributes to an overstatement of friction reducer hydration characteristics. Further, this type of mixing does not begin to replicate the field hydraulic engineering conditions represented by the blender tub. The blender tub for a hydraulic fracturing operation has 14.7 seconds of mixing intensity residence time. In order to generate data that reliably predicts field performance, the blender tub mixing operation must be simulated by the friction flow loop test apparatus. Neither the apparatus nor method is set up to do this in the prior art.

The method of chemical introduction for both units is typically to inject a syringe dosage of friction reducer into the top of the tank and allow the low shear top mounted mixer to hydrate the polymer at near perfect conditions. Chemical injection in the friction flow loop must simulate the hydraulic engineering conditions of chemical injection into the blender tub during field operations in order to reliably predict field performance. Neither the apparatus nor method is set up to do this in the prior art.

As mentioned in item one, both units are set up to recirculate the treated fluid back to the feed tank. Thus, the apparatus makes it possible to measure the shear survivability of the friction reducer being tested. However, this is not pragmatically possible to do by method given that the fluid spends seconds in the recirculating loop piping that reflects well bore shear rates and minutes in the feed tank relaxing the fluid. In field application, shear rates are forced on the fluid for 3 minutes between the blender tub and the perforation. In order to simulate polymer survivability at well bore conditions, the shear rate has to be maintained for 3 minutes at pipe shear conditions. Neither apparatus nor method is set up to do this in the prior art.

Prior art is known to suffer reliability issues with the recirculating pump as low shear rate pumps are susceptible to failure when cavitated. Friction flow loop level control components are points of failure that cause cavitation and pump failure to occur. This reliability risk can be eliminated mechanically. Neither apparatus nor method is set up to do this in the prior art.

It is therefore desirable to provide a friction flow loop test method and apparatus that simulates well bore hydraulic conditions during fracturing. The above discussed limitations in the prior art are not exhaustive. The current invention provides an inexpensive, time saving, more reliable apparatus and method of using the same where the prior art fails.

SUMMARY OF THE INVENTION

In view of the foregoing disadvantages inherent in the known types of friction flow loop test method and apparatus now present in the prior art, the present invention provides a new and improved tool and method of use which may simulate well bore hydraulic conditions during fracturing to optimize same. As such, the general purpose of the present invention, which will be described subsequently in greater detail, is to provide a new and improved friction flow loop apparatus, system, and method of using the same, which has all the advantages of the prior art devices and none of the disadvantages.

To attain this, the present invention essentially comprises friction flow loop test method and apparatus that simulates well bore hydraulic conditions during fracturing utilizing large dual tanks with a primary feed tank and a secondary receiving tank wherein friction reducer hydration is controlled in an environment matching the well bore and is unaffected by recirculation mixing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved friction flow loop apparatus, system, and method of using the same, which may simulate well bore hydraulic conditions during fracturing to optimize same.

It is a further object of the present invention to provide a new and improved friction flow loop apparatus, system, and method of using, which may be easily and efficiently manufactured and marketed.

An even further object of the present invention is to provide a new and improved friction flow loop apparatus, system, and method of using same which is susceptible to a low cost of manufacture with regard to both materials and labor, and which accordingly is then susceptible to low prices of sale to the consuming industry, thereby making such value economically available to those in the field.

Still another object of the present invention is to provide a new and improved friction flow loop apparatus, system, and method of using, which provides all of the advantages of the prior art, while simultaneously overcoming some of the disadvantages normally associated therewith.

Another object of the present invention is to provide a new and improved friction flow loop apparatus, system, and method of using that may accurately measure hydration speed of the fluid to provide data that will reliably predict field performance.

Yet another object of the present invention is to provide a new and improved friction flow loop apparatus, system, and method of using that provides mixing that replicate the field hydraulic engineering conditions represented.

An even further object of the present invention is to provide a new and improved friction flow loop apparatus, system, and method of using the same that may simulate polymer survivability at well bore conditions and at a shear rate that is maintained for 3 minutes at pipe shear conditions.

Still another object of the present invention is to provide a new and improved friction flow loop apparatus, system, and method of using that provides a friction flow loop level control with components that does not cause cavitation and pump failure to occur.

Yet still another object of the present invention is to provide a new and improved friction flow loop apparatus, system, and method of using that provides a friction reducer with holistic fluid hydration speed, holistic fluid film duration time, holistic fluid active dosage threshold, holistic fluid shear stability time, and holistic fluid on the fly rheology at hydraulic fracturing field operating pipe shear conditions.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices wherein.

DETAILED DESCRIPTION OF THE PREFERRED EMBODIMENTS

Figure 1:
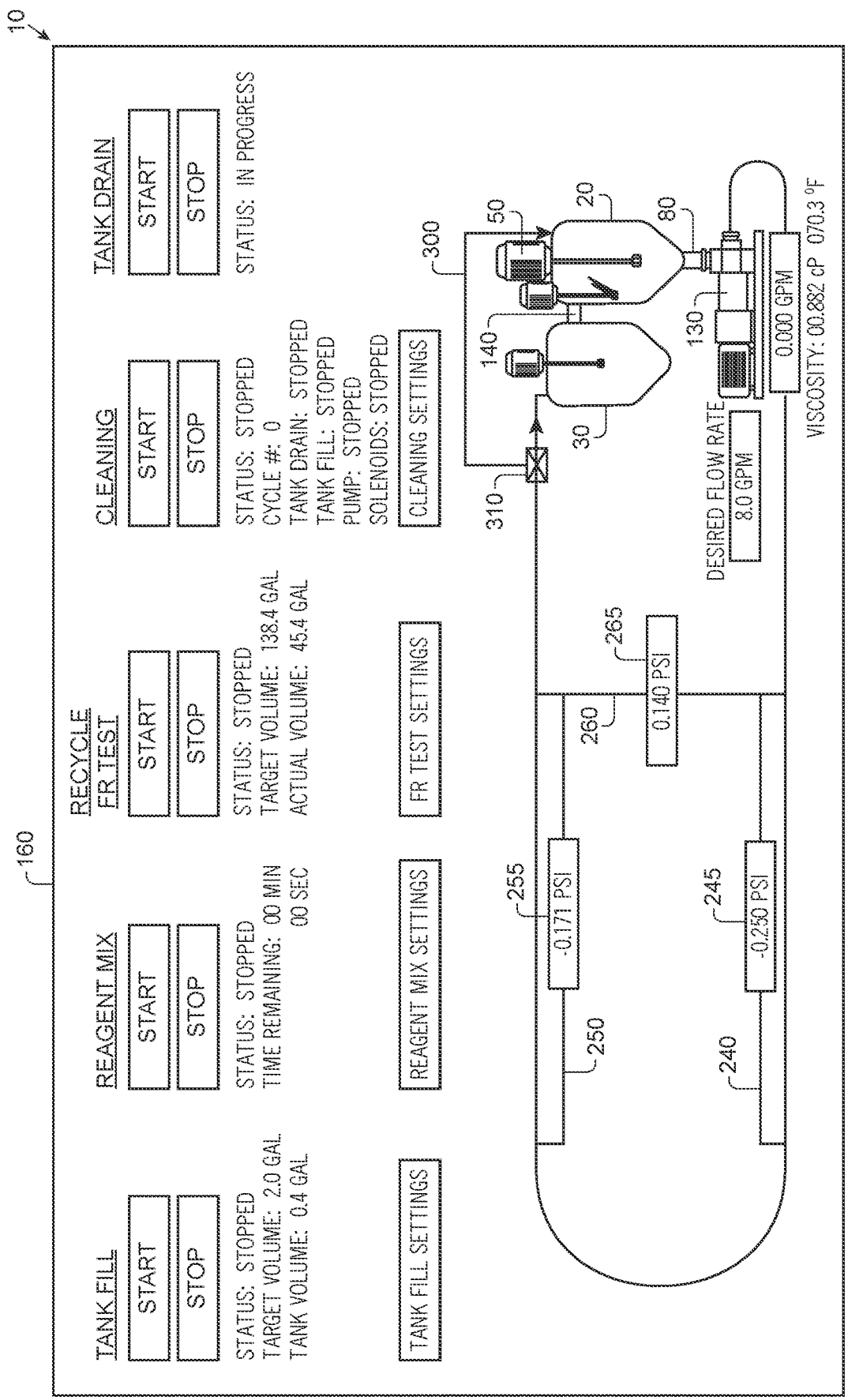
FIG. 1 is a general illustration of a preferred embodiment of the invention depicting a display.
Figures 2, 3:
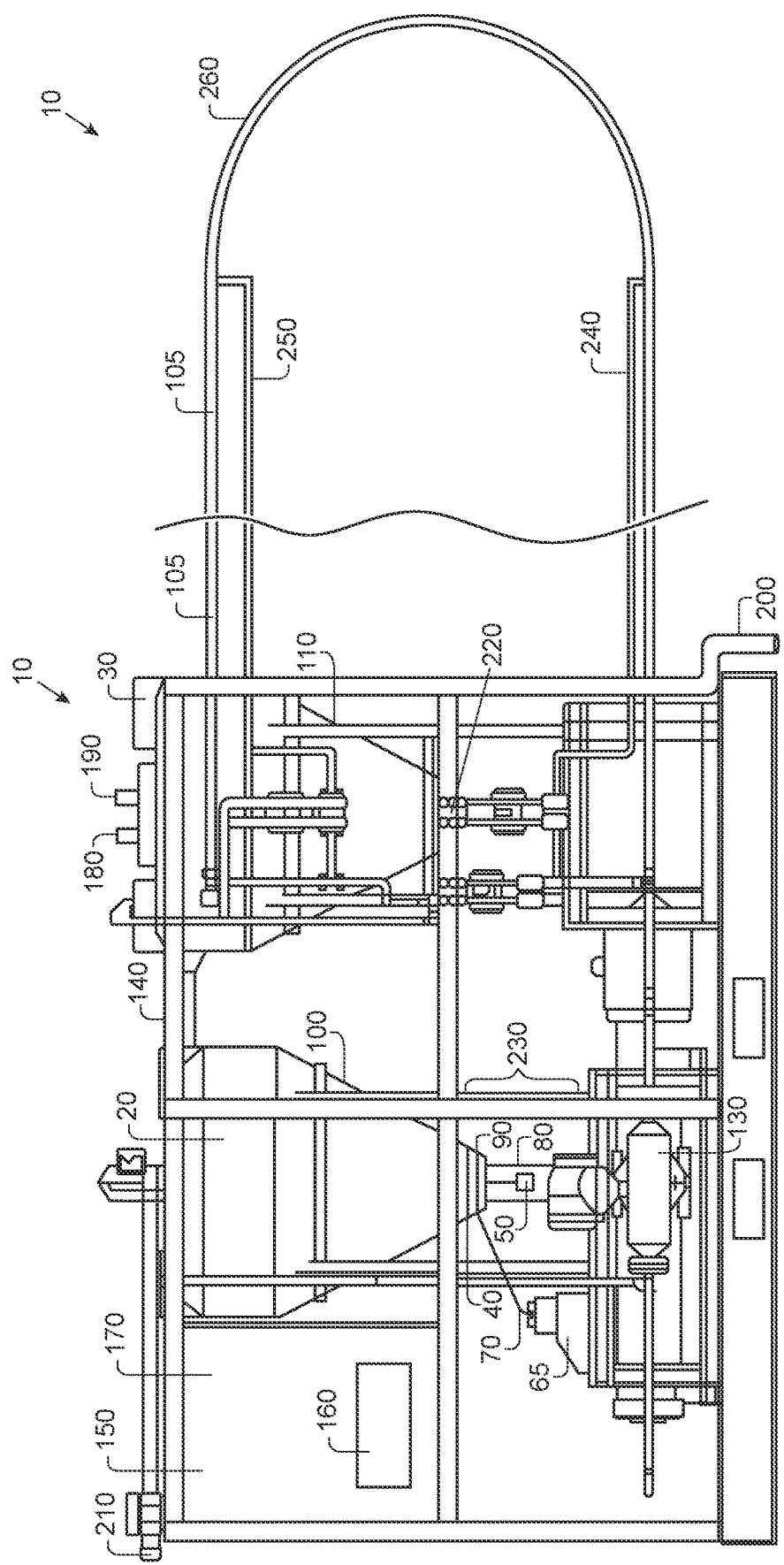
FIG. 2 is a general illustration of a preferred embodiment of the invention depicting a back view with a cut away of loop.
FIG. 3 is a general illustration of a preferred embodiment of the invention depicting a back view with the rest of cut away of loop from FIG. 2.
Figure 5:
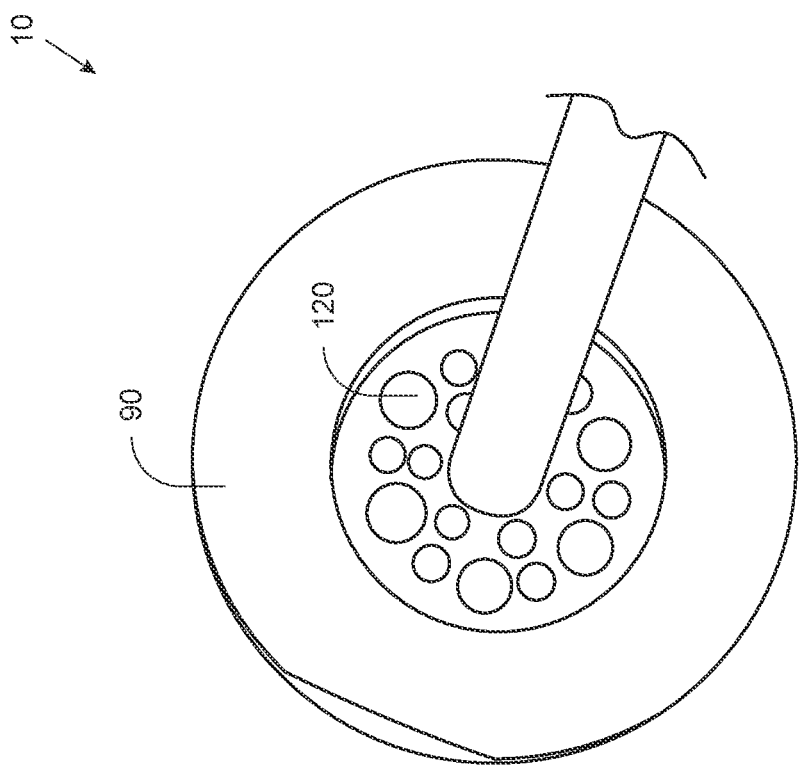
FIG. 5 is a general illustration of a preferred embodiment of the invention depicting a fritted disc plate.
Figure 4:
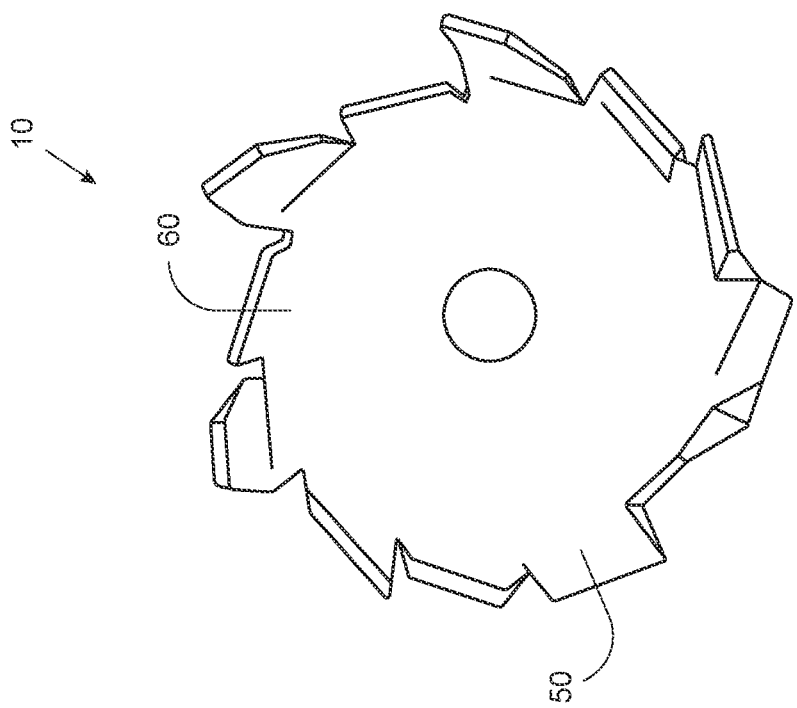
FIG. 4 is a general illustration of a preferred embodiment of the invention depicting a mixing propeller.
Figure 6:
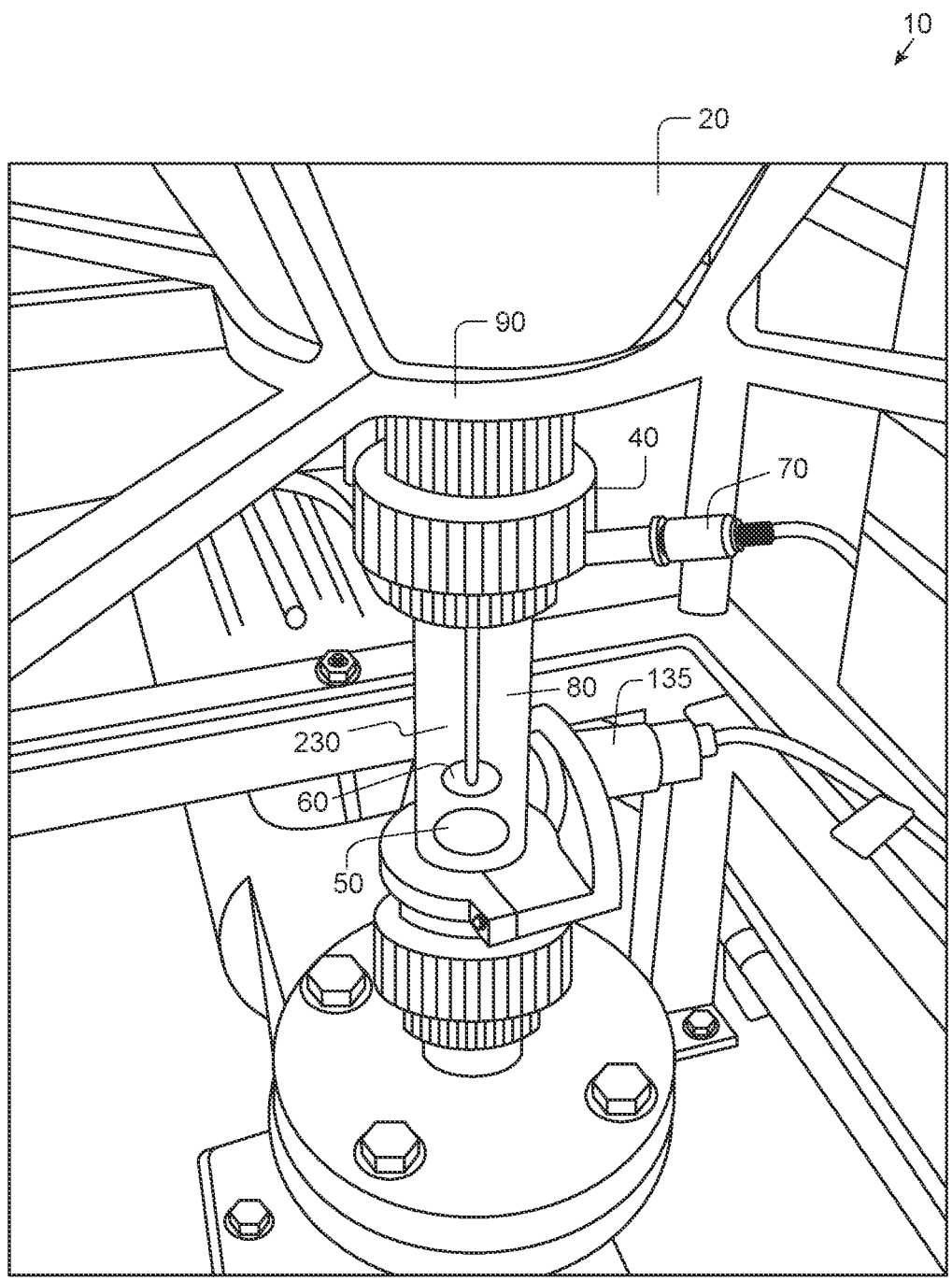
FIG. 6 is a general illustration of a preferred embodiment of the invention depicting a perspective view.
Figure 7:
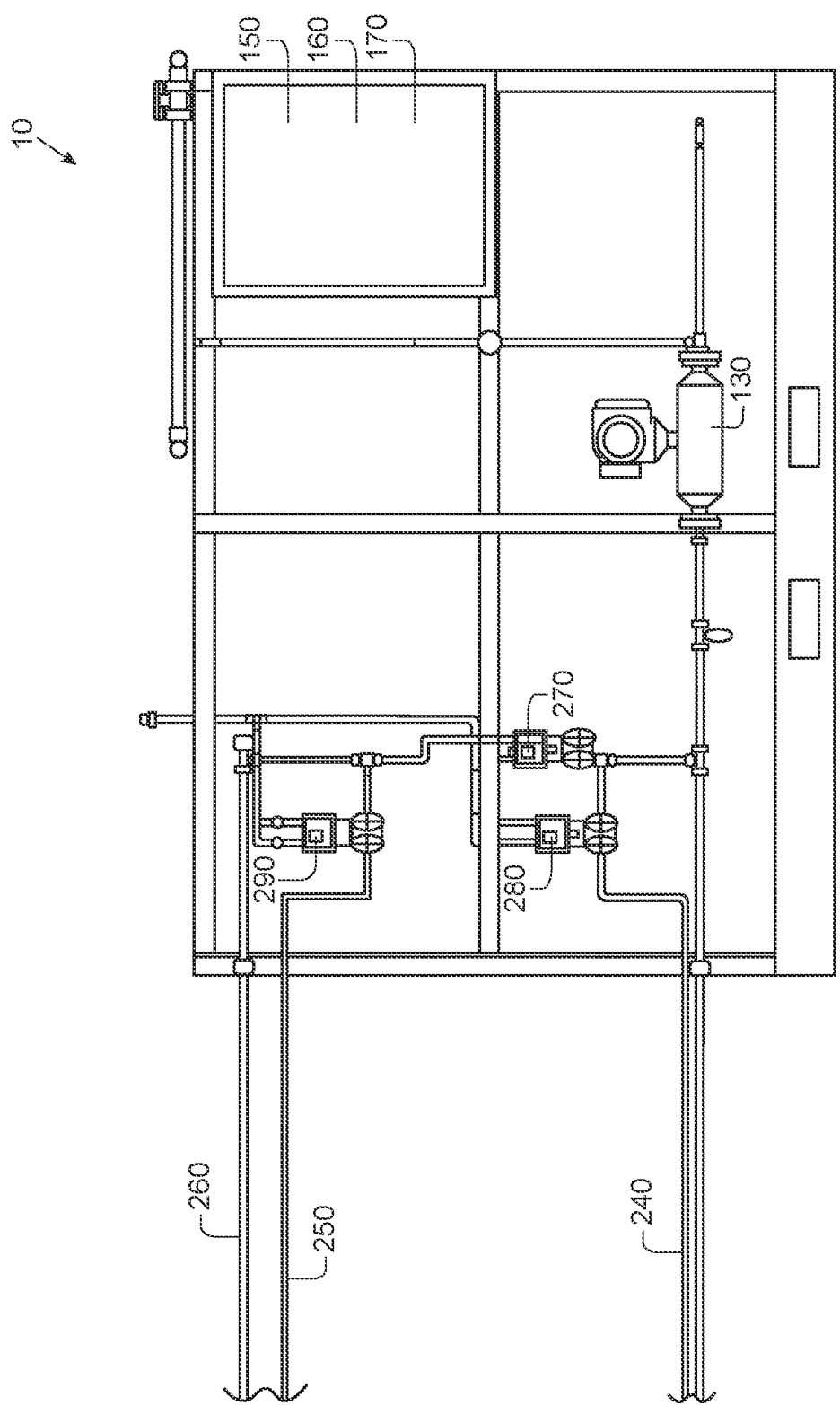
FIG. 7 is a general illustration of a preferred embodiment of the invention depicting a front view with a cut away of loop of FIG. 1.

Referring to the illustrations, drawings, and pictures, reference character 10 generally designates a new and improved friction flow loop apparatus, system, and method of using same in accordance with the present invention. Invention 10 is generally used in conjunction with well fracturing for the retrieval of hydrocarbons below the surface. It is contemplated that invention 10 may be utilized for other well applications other than hydrocarbon retrieval such as but not limited to water retrieval. It is also contemplated that invention 10 may be utilized in other embodiments for the purpose of measuring hydrocarbon drag reducing agent efficacy in pipeline applications.

Invention 10 utilizes large dual tanks with a primary feed tank 20 and a secondary receiving tank 30. This solves the recirculation disadvantages of prior art. Friction reducer hydration is controlled in an environment matching the well bore and is unaffected by recirculation mixing. A preferred embodiment may utilize a 45 gallon primary feed tank 20 that allows for a 30 gallon volume once through on the fly experiment at 8 GPM through 0.43" ID pipe, which results in a shear rate 3946 reciprocal seconds. The invention 10 allows for adjustable shear rates in other embodiments that range from 500 to 6000 reciprocal seconds without fluid recirculation back to the primary feed tank 20.

Invention 10 may utilize inline chemical injection with a pump suction spool piece 40 that includes a first mixer 50 at the point of injection to simulate the blender tub residence time and mixing intensity during hydraulic fracturing. This solves the bulk tank mixing disadvantages of prior art. A preferred embodiment utilizes pump suction spool piece 40 mixing zone volume of 0.163 gallons with chemical injection just above a mixing propeller 60 of six blades with a surface area per blade of 0.25 square inches at a pitch angle of 45 degrees traveling at 1750 rpm speed of rotation. Other embodiments may have smaller or larger pump suction spool piece 40 mixing zone volume designs with corollary mixing blade dimensions and speeds of rotation. Chemical injection is introduced via a syringe pump 65 into the pump suction spool piece 40 mixing zone utilizing an injection quill 70. In the preferred embodiment, the injection quill 70 is ⅛" ID and is set into the pump suction spool piece 40 mixing zone by ¾" to avoid friction reducer sticking to the pipe wall or mixing propeller 60 shaft rather than being introduced into the bulk fluid flow.

Invention utilizes syringe pump 65 that injects into a simulated blender tube 80 to permit on the fly injection that precisely emulates field chemical injection into the blender tub and subsequent travel into the well bore. This solves the prior art disadvantages of injecting the chemical into the top of the bulk tank. A preferred embodiment utilizes syringe pump 65 that enables plus or minus 0.01 GPT accuracy friction reducer dosage rate control of 0.1 GPT to 4.0 GPT based on the fluid flow rate.

Invention utilizes cone bottom tanks for primary feed tank 20 and secondary receiving tank 30 and a fritted disc plate 90 in the fluid flow entrance to the pump suction spool piece 40 and allows invention 10 to set up in recycle mode to shear the fluid for three minutes at hydraulic fracturing shear rate conditions without pump cavitation or suction side fluid vortexing. The prior art cylindrical tanks require a larger feed tank inventory volume to avoid pump cavitation and fluid vortexing occurs.

In a preferred embodiment, the cone bottom primary feed tank 20 can operate with an inventory volume as low as two gallons. In a preferred embodiment, primary feed tank 20 and secondary receiving tank 30 have cone bottom side walls 100 and 110, respectively that have a slope of but not limited to 45 degrees. In the preferred embodiment, the fritted disk plate 90 may be utilized to avoid vortexing and is installed just ahead of the mixing zone pump suction spool piece 40 and may be equipped with eighteen apertures 120 each varied sized apertures 120 ranging from ¼" ID to ⅜" ID for flow diffusing. The apertures 120 are arranged in a strategic pattern to balance pump suction flow without vortexing even though mixing propeller 65 is installed into the pump suction spool piece 40. Other tank side walls 100 and 110 slopes and matched fritted disk plate 90 embodiments are contemplated. The invention 10 enables the fluid to proportionately spend more time at shear conditions in a pipe and or loop 105 than relaxing in the primary feed tank 20. Shear time equal to that which occurs at hydraulic fracturing conditions (3 minutes) can be ran in 30 minutes with invention 10 whereas prior art would require operating for 20 hours per experiment and would burn up fluid pump or pump 130.

Invention includes a spill over line 140 at lower inventory from the secondary receiving tank 30 back into the primary feed tank 20. Line 140 makes it physically impossible for the primary feed tank 20 to run empty, which would cavitate and destroy fluid pump 130. This solves the reliability problem that plagues prior art. It is contemplated to provide a low level sensor 135 that shuts the pump fluid 130 off if the fluid level drops too low.

Invention 10 may collect data every 250 milliseconds, have a control panel 150, and a read out display 160 in communication with a computer 170. Still further, invention 10 may include a cold water inlet 180, a hot water inlet 190, a drain 200, a first motorized ball valve 210, a second motorized ball valve 220, a dispersing mixing assembly 230, and so forth.

Invention 10 contemplates measuring a first loop 240, a second loop 250, and a third loop 260 of loop 105. First loop 240 may be defined from starting at fluid pump 130 and ending at a first differential pressure sensor 280 and adapted to determine a first pressure differential 245 between same. A second loop 250 may be defined from starting at fluid pump 130 and ending at a second differential pressure sensor 290 and adapted to determine a second pressure differential 255 between same. A third loop 260 may be defined from starting at variable fluid pump 130 and ending at a third differential pressure sensor 270 and adapted to determine a third pressure differential 265 between same.

First differential pressure sensor 280, second differential pressure sensor 290, third differential pressure sensor 270, and fluid pump 130 are all in communication with control panel 150, and read out display 160 in communication with computer 170.

Display 160 may include but is not limited to tank fill status and settings, reagent mix status and settings, recycle FR test status and settings, cleaning status and settings, tank drain status, viscosity, and desired flow rate, combinations thereof and so forth.

It is also contemplated invention 10 may include a recirculation conduit 300 from second receiving tank 30 to primary feed tank 20 with a valve 310 that allows change from once through to recycle mode.

Changes may be made in the combinations, operations, and arrangements of the various parts and elements described herein without departing from the spirit and scope of the invention. Furthermore, names, titles, headings, and general division of the aforementioned are provided for convenience and should, therefore, not be considered limiting.

I claim:

1. A system to simulate well bore hydraulic conditions for determining associated affects friction reducers have on fluids over a wide range of pressures and flow rate conditions for optimal results during fracturing comprising: a primary feed tank having a conical bottom adapted to store and dispense said fluids; a mixing assembly connected below said primary tank and adapted to receive said fluids, and said friction reducers from a syringe pump for mixing with a propeller; a variable pump connected to said mixing assembly and adapted to pass mixed said fluids and said friction reducers; a computer; a first loop adapted to pass mixed said fluids and said friction reducers from said variable pump to a first differential pressure sensor and adapted to determine a first pressure differential between said variable pump and said first differential pressure sensor; a second loop adapted to pass mixed said fluids and said friction reducers from said variable pump to a second differential pressure sensor and adapted to determine a second pressure differential between said variable pump and said second differential pressure sensor; a third loop adapted to pass mixed said fluids and said friction reducers from said variable pump to a third differential pressure sensor and adapted to determine a third pressure differential between said variable pump and said third differential pressure sensor; wherein said variable pump, said first differential pressure sensor, second differential pressure sensor, and said third differential pressure sensor, and said a mixing assembly are in communication with said computer; wherein said first differential pressure sensor, said second differential pressure sensor, and said third differential pressure sensor are connected to a secondary receiving tank having a conical bottom and a spill over line to said primary feed tank; and said system is adapted to provide adjustable shear rates that range from 500 to 6000 reciprocal seconds without said fluids recirculation back to said primary tank.

\* \* \* \* \*